May 19, 1970

A. D. APPLETON 3,513,340

HOMOPOLAR ELECTRIC MACHINES

Filed Jan. 6, 1967

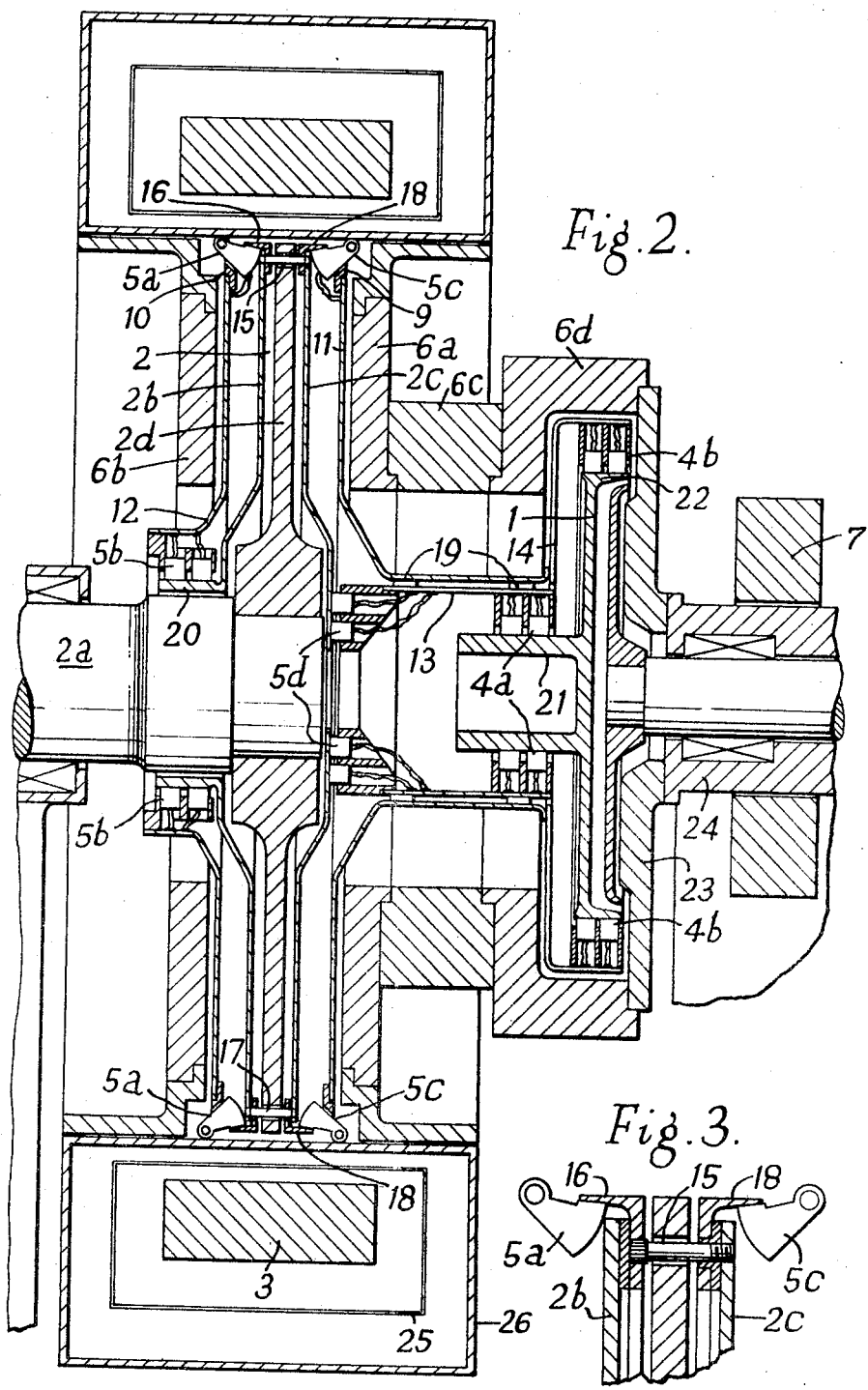

United States Patent Office 3,513,340
Patented May 19, 1970

3,513,340
HOMOPOLAR ELECTRIC MACHINES
Anthony Derek Appleton, Newcastle upon Tyne, England, assignor to International Research & Development Company Limited, Newcastle upon Tyne, England
Filed Jan. 6, 1967, Ser. No. 607,784
Claims priority, application Great Britain, Jan. 12, 1966, 1,530/66
Int. Cl. H02k 31/00, 47/14
U.S. Cl. 310—113                                10 Claims

ABSTRACT OF THE DISCLOSURE

A homopolar machine is disclosed having two rotors in a common magnetic field, preferably provided by a superconducting coil, one of the rotors being driven by an external prime mover, such as an electric motor, and acting as a generator which supplies current to the other rotor which serves as a motor giving a low-speed high torque output.

---

Figure 1:
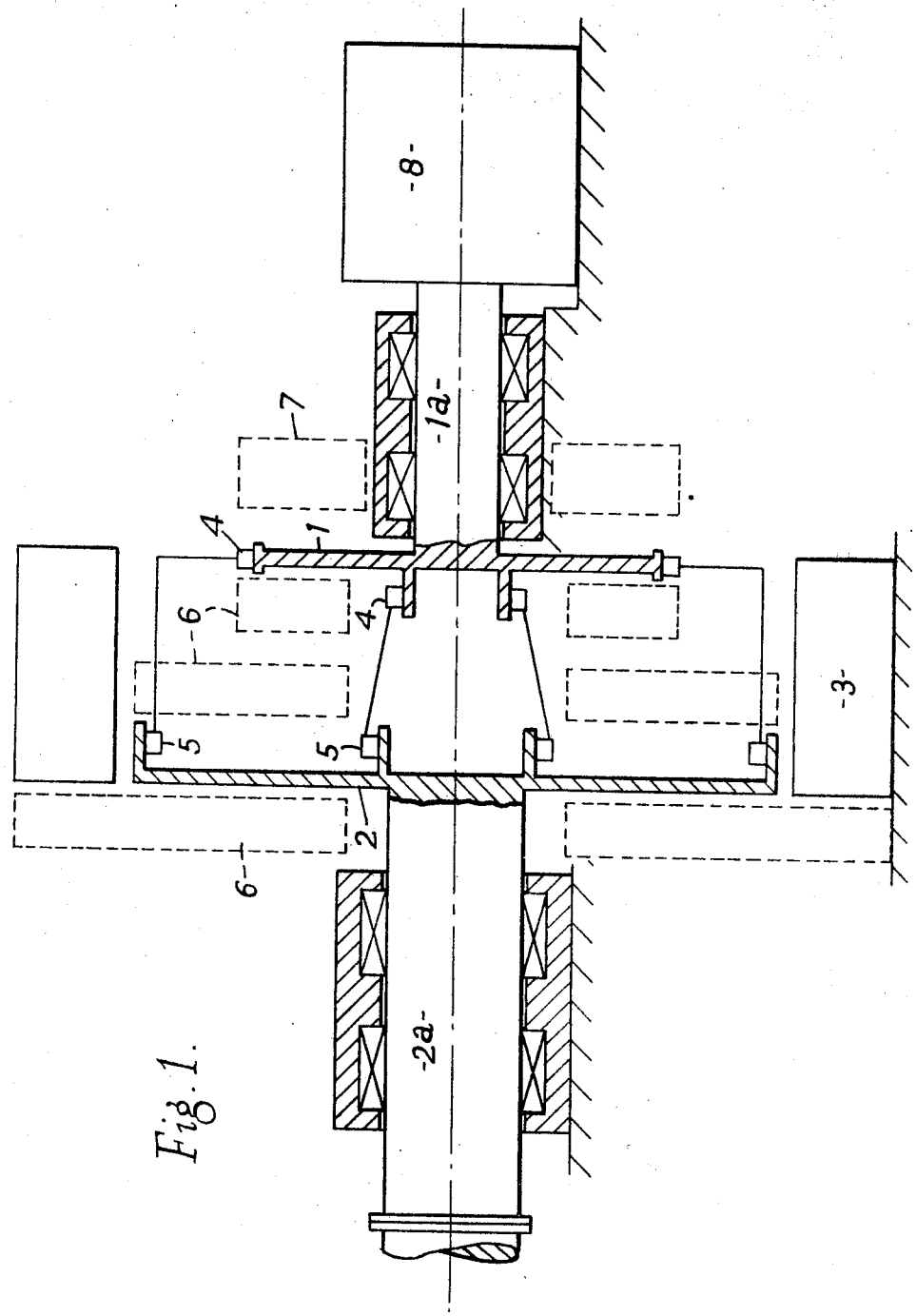

The present invention relates to homopolar electrical machines.

According to the invention there is provided a homopolar electrical machine comprising a prime mover, a first rotor mechanically coupled to the prime mover, a second rotor rotatable independently of the first rotor in a mechanical sense, the two rotors each having a conducting path for electric current and being disposed in a common magnetic field, and means for transferring current generated in the first rotor, as a result of its rotation by the prime mover in the magnetic field, to the second rotor, whereby the second rotor will be caused to rotate. This arrangement of the first rotor with the second rotor in a common magnetic field enables the very high currents required by the second rotor to be generated within the machine and easily transferred to the second rotor. The provision of a separate generator and the use of a very large rectifier are avoided. The prime mover may be an electric motor rotating at relatively high speed while the output of the machine is at relatively low speed but with high torque.

Each rotor may take the form of a disc or drum or a plurality of discs or drums mounted on a common shaft. The whole of each disc or drum may be an electrically conducting body or it may be of non-electrically conducting material supporting electrically conductive material providing the paths for electric current.

The magnetic field may be produced by a superconducting coil or by a conventional magnet preferably with a core of magnetisable material to assist in concentrating the magnetic flux. In either case whether a superconducting coil or a conventional magnet be used, further magnetisable material can be used in the vicinity of the rotors to concentrate the magnetic field flux in these regions.

The current transfer means may be of the solid contact or liquid contact type. In the case of the solid contact type, which is the preferred form, the current transfer may be through brushes and slip rings. In the case of the liquid contact type the current transfer can take place between a solid contact and a liquid contact, for example mercury.

The invention will now be described in more detail with the aid of an example illustrated in the accompanying drawings, in which:

FIG. 1 shows diagrammatically a homopolar electrical machine in accordance with the invention for use as a low speed motor, FIG. 2 is a longitudinal section of a typical machine of the general form illustrated in FIG. 1, and FIG. 3 is a detail of FIG. 2 on an enlarged scale.

The homopolar machine shown in FIG. 1 comprises two rotors 1 and 2.

Each rotor is in the from of a disc of electrically conducting material such as copper. The copper discs may each be mounted on a supporting disc of non-electrically conducting material.

Each rotor rotates within a magnetic field common to both rotors and provided by a single superconducting coil 3, which surrounds the rotors.

The rotors are mounted on separate shafts, rotor 1 on shaft 1a and rotor 2 on shaft 2a. Each rotor can rotate mechanically independently of the other although the speed of the rotors is governed by the electrical connection between them.

The shaft 1a is driven by a prime mover 8 and the rotor 1 acts as a homopolar generator. Current is transferred, by sets of brushes 4 and 5 engaging the rotors 1 and 2, respectively, from the rotor 1 to the rotor 2, and the rotor 2 consequently acts as a homopolar motor. The current transfer near the axis of the machine may be achieved by mounting a brush holder on one of the rotors, say the rotor 2, and allowing a brush in the brush holder to bear directly on the rotor 2. This mehod eliminates one set of brushes.

In a typical example the prime mover 8 is an 8000 H.P. electric motor rotating at say 1500 r.p.m. The rotor 1 has a diameter of the order of 4 ft. and generates at 80 volts to supply a current of 75,000 amps. to the rotor 2. The rotor 2 has a diameter of the order of 8 ft. and rotates at a speed of 200 r.p.m.

The rotors may be placed as close together as practical considerations in the arrangement of the current transfer means permit. As the current transfer means carry high current it may be desirable in some instances to provide a cooling arrangement.

Whilst rotors of different diameter have been described and illustrated it is not essential that the rotors be of different diameter. The diameter chosen will be governed by mechanical strength, the strength of the magnetic field and the speeds of the two rotors.

It may be ncessary in some instances to use members 6 and 7 of a magnetisable material such as iron in the vicinity of the rotors to concentrate the magnetic field in the region of the rotors. It will be appreciated that the superconducting coil 3 induces magnetism in the members 6 and 7. Such material could be used, not only in the case of a superconducting coil such as that shown, but also in the case where a magnet of conventional form is used. If a conventional magnet is used the iron core may be shaped to provide a gap between poles and the rotors be disposed in this gap.

The machine is designed to act as a low speed low voltage high current and high torque motor.

In the arrangement shown the control of the speed of the rotor 2 which acts as a motor is effected by varying the voltage generated in the generator rotor 1. This may be achieved by one or more of the following:

(1) Varying the speed of the prime mover 8.

(2) Moving the iron member 7 to vary the magnetic flux which cuts the generating rotor 1.

(3) Varying the main field current in the coil 3. Because of the geometry and effects of the members 6 and 7, such a change in field current may cause a change in the magnetic flux cutting one rotor which is different from the change in magnetic flux cutting the other rotor.

The main advantage of the arrangement described is that the need for a separate generator to supply the very high currents required by the motor is eliminated. In such a separate generator it would be necessary to provide either a high magnetic field or a large number of conductors in a homopolar type machine. Alternatively a very large rectifier would be required.

Referring to FIG. 2 the rotor 2 is formed by two discs 2b and 2c, of an electrically conducting material such as copper mounted on a support disc 2d of non-magnetic material such as stainless steel.

In the form shown the brushes 5 associated with rotor 2 are arranged in four sets, two sets 5a and 5d making electrical connection with the disc 2c and the other sets 5b and 5c making electrical connection with the disc 2b, as will be explained in more detail below.

The brushes 5a and 5c are privotally mounted on non-magnetic rims 9 and 10 on stationary electrically conducting discs 11 and 12 respectively. The discs 11 and 12 are mounted on members 6a and 6b respectively, which are of magnetic material. Further members 6c and 6d of magnetic material form part of the structure and serve to concentrate the magnetic flux. The brushes 5b are mounted on a cylindrical hub of disc 12 and engage a slip ring 20 in the form of a cylindrical flange on the disc 2b, whilst brushes 5d are mounted on a stationary electrically conducting sleeve 13 and engage the disc 2c.

The sleeve 13 also carries brushes 4a engaging a slip ring 21 in the form of a cylindrical flange on the inner region of the disc 1. Brushes 4b engaging a slip ring 22 in the form of a cylindrical flange on the outer periphery of the disc 1 are supported on a stationary electrically conducting disc 14 rigidly connected to the disc 11.

Current is transferred from the generator disc 1 through brushes 4a, sleeve 13 and brushes 5d to the disc 2c. The current then passes from the periphery of the disc 2c through electrically conducting studs 15, as can be seen more clearly in the enlarged view of FIG. 3, to a slip ring 16 mounted on but electrically insulated from the disc 2b. The brushes 5a collect current from the slip ring 16 and feed it into the stationary disc 12. From the disc 12 it passes via brushes 5b to the disc 2b. Current passes from the disc 2b through studs 17, which alternate with the studs 15 around the periphery of the rotor, into a slip ring 18 mounted on but insulated from the disc 2c. From the slip ring 18 the current is collected by brushes 5c connected to the stationary disc 11. From the disc 11 it passes via the disc 14 to the brushes 4b which feed the current back into the generator disc 1. The discs 2b, 2c are thus connected electrically in series.

The sleeve 13 and the stationary disc 11 are rigidly connected together but electrically insulated from one another by insulating rings 19.

The magnetic member 6d is supported by a non-magnetic spider 23 which is attached to a bearing sleeve 24 which supports the shaft 1a. The iron ring 7 is movable axially on the sleeve 24 to enable the speed of the machine to be altered.

The magnetic members 6a and 6b, which concentrate the magnetic-field in the region of rotor 2, have magnetism induced in them by means of the field generated by the superconducting coils 3. It will be appreciated from FIG. 2 that magnetism is induced in the magnetic members 6c and 6d through a magnetic circuit including the coils 3 and magnetic member 6a. Magnetic member 6d therefore has the effect of concentrating the magnetic field generated by coils 3 in the vicinity of rotor 1.

Magnetic flux is induced on the iron ring 7 by the same source of magnetic-field, namely, the coils 3.

The superconducting coil 3, which is operated at a low temperature maintained by a cryostat, is surrounded by a radiation shield 25 and an outer casing 26, which may be partially evacuated, in order to provide thermal insulation.

I claim:

1. A homopolar electrical machine comprising a prime mover, a first rotor coupled to said prime mover for rotation thereby, a second rotor rotatable mechanically independently of said first rotor, a magnetic-field generating means, said rotors both being disposed in the common field produced by said generating means, each of said rotors having a conducting path for electric current, and means for transferring current from said first to said second rotor whereby current generated in the first rotor is transferred to the second rotor to cause it to rotate, said means comprising stationary first current transfer means connecting outer regions of the two rotors and second current transfer means connecting the inner regions of the two rotors.

2. A machine as claimed in claim 1 in which the second rotor comprises two electrically-conducting discs, the means for transferring current from the first to the second rotor are electrically connected to the inner region of one of the discs and to the outer region of the other of the discs, and the outer region of the said one of the discs is electrically connected to the inner region of the other disc.

3. A machine as claimed in claim 2 in which the second rotor comprises a supporting disc, said electrically-conducting discs being mounted on opposite sides of the supporting disc, first and second slip rings encircling but insulated from the electrically-conducting discs, and studs passing through the peripheral region of the supporting disc and electrically connecting each of said electrically conducting discs with one of said slip rings on the opposite side of the supporting disc, said machine further comprising a stationary conducting plate mounted on the side of the second rotor remote from the first rotor, a first set of brushes mounted on said plate and engaging the inner region of the adjacent one of said electrically conducting discs, a second set of brushes mounted on said plate and electrically connected by said plate to the first set of brushes, said second set of brushes engaging the slip ring encircling the said adjacent one of the electrically conducting discs, and a third set of stationary brushes engaging the other of said slip rings and electrically connected to said first rotor.

4. A homopolar machine as claimed in claim 1 in which each rotor comprises a disc of electrically-conducting material.

5. A homopolar machine as claimed in claim 4 in which each rotor comprises a non-conducting disc, said disc of electrically conducting material being supported by said non-conducting disc.

6. A homopolar machine as claimed in claim 1 in which said magnetic-field generating means comprise a superconducting coil.

7. A homopolar machine as claimed in claim 1 including at least one body of magnetisable material disposed in the vicinity of at least one of the rotors to concentrate magnetic flux in the region of the rotor.

8. A homopolar machine as claimed in claim 1 in which the rotors are of disc form and the discs have cylindrical flanges which are engaged by said current transfer means.

9. A homopolar machine as claimed in claim 1 in which the first rotor is of smaller diameter than the second rotor.

10. A homopolar machine as claimed in claim 1 including at least one body of magnetic material disposed in the vicinity of at least one rotor, said body being movable relative to the rotor to vary the magnetic flux linked with the rotor.

References Cited

UNITED STATES PATENTS

| | | | |
|---|---|---|---|
| 2,383,669 | 8/1945 | Moore | 310—113 |
| 2,433,390 | 12/1947 | Packer | 310—113 |
| 2,633,545 | 3/1953 | Rieth | 310—102 |
| 3,368,087 | 2/1968 | Madsen | 310—52 |
| 3,382,570 | 5/1968 | Knapp et al. | 310—208 |
| 2,408,080 | 9/1946 | Lloyd | 310—178 |

OTHER REFERENCES

Steinmetz: Theory and Calculations of Electrical Apparatus, chap. 22, p. 453.

MILTON O. HIRSHFIELD, Primary Examiner

L. A. ROUSE, Assistant Examiner

U.S. Cl. X.R.

310—126, 178